(12) United States Patent
Iwaki

(10) Patent No.: US 9,501,840 B2
(45) Date of Patent: Nov. 22, 2016

(54) INFORMATION PROCESSING APPARATUS AND CLOTHES PROPOSING METHOD

(71) Applicant: TOSHIBA TEC KABUSHIKI KAISHA, Shinagawa-ku, Tokyo (JP)

(72) Inventor: Kiyoshi Iwaki, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 95 days.

(21) Appl. No.: 14/518,098

(22) Filed: Oct. 20, 2014

(65) Prior Publication Data

US 2016/0110886 A1    Apr. 21, 2016

(51) Int. Cl.
*G06K 9/00*    (2006.01)
*G06T 7/60*    (2006.01)

(52) U.S. Cl.
CPC ..... *G06T 7/602* (2013.01); *G06T 2207/30196* (2013.01); *G06T 2210/16* (2013.01)

(58) Field of Classification Search
USPC ........................................................ 382/111
See application file for complete search history.

(56) References Cited

U.S. PATENT DOCUMENTS

| | | | |
|---|---|---|---|
| 7,293,368 B1* | 11/2007 | Faulk ..................... | G01C 11/00 33/194 |
| 2010/0030578 A1* | 2/2010 | Siddique ............ | G06Q 10/0637 705/3 |
| 2013/0101168 A1 | 4/2013 | Naito et al. | |
| 2014/0314276 A1* | 10/2014 | Wexler .................... | G06T 7/602 382/103 |
| 2015/0006334 A1* | 1/2015 | Behuria ............. | G06Q 30/0643 705/27.2 |

* cited by examiner

*Primary Examiner* — Yon Couso
(74) *Attorney, Agent, or Firm* — Amin, Turocy & Watson LLP

(57) ABSTRACT

According to one embodiment, an information processing apparatus includes an interface and a control part. The interface receives an image which is transmitted from a first terminal and in which a person and an object as a reference of magnitude of one pixel are photographed. The control part calculates a size of clothes suitable for the person based on the image and a magnitude of the object in the image, and transmits information relating to the clothes with this size to the first terminal through the interface.

10 Claims, 8 Drawing Sheets

| FIRST FEATURE | | |
|---|---|---|
| FEATURE KIND | | CHARACTER INFORMATION |
| COLOR | PATTERN | |
| BLACK | SOLID COLOR | ALPHABET |

702

| No. | | SECOND FEATURE | | DIMENSION INFORMATION | | |
|---|---|---|---|---|---|---|
| | COLOR | PATTERN | CHARACTER INFORMATION | CLOTHES LENGTH | SLEEVE LENGTH | LENGTH AROUND NECK |
| 1 | WHITE | FLOWER PATTERN | NOTHING | 100 | 70 | 30 |
| 2 | BLUE | FLOWER PATTERN | NOTHING | 110 | 75 | 50 |
| 3 | RED | SOLID COLOR | CHINESE CHARACTER | 150 | 80 | 45 |
| 4 | BLACK | SOLID COLOR | ALPHABET | 120 | 60 | 44 |
| 5 | GREEN | SOLID COLOR | NUMERAL | 130 | 90 | 60 |
| . | | | | | | |
| . | | | | | | |
| . | | | | | | |

INFORMATION PROCESSING APPARATUS AND CLOTHES PROPOSING METHOD

FIELD

Embodiments described herein relate generally to an image recognition technique.

BACKGROUND

When clothes are purchased, the person himself or herself tries the clothes on and purchases the clothes with suitable size.

However, in order to try them on, the person himself or herself is required to go to the store. Besides, even if clothes with the same size are tried on, there is a case where they are different in clothes length or sleeve length and are not suitable for the body type.

DESCRIPTION OF THE DRAWINGS

FIG. 7 is a view showing a table information stored in a HDD and is a view showing an example when checking is performed by an obtained first feature.

DETAILED DESCRIPTION

In general, according to one embodiment, an information processing apparatus includes an interface and a control part. The interface receives an image which is transmitted from a first terminal and in which a person and an object as a reference of magnitude of one pixel are photographed. The control part calculates a size of clothes suitable for the person based on the image and a magnitude of the object in the image, and transmits information relating to the clothes with this size to the first terminal through the interface.

A system of the embodiment analyzes a person image photographed by a portable terminal, and proposes the size of clothes suitable for the photographed person. According to the embodiment, when clothes are presented, under the circumstances in which the partner is located far away and can not come to the store, the size can be determined by inputting the image to a server (information processing apparatus) installed in the store.

The system of the embodiment measures respective parts of the person from the photographic image, and calculates dimensions of the respective parts. Besides, the system specifies clothes worn by the person in the photographic image (the clothes are inevitably already sold), and acquires dimension information of the clothes by inquiring an existing database. The system uses the dimension information and corrects the size measured from the photographic image. Hereinafter, the embodiment will be described with reference to the drawings.

Figure 1:
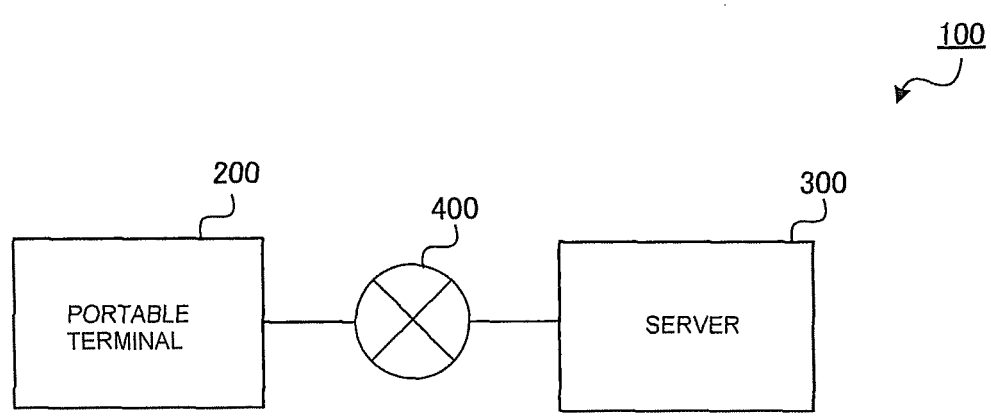
FIG. 1 is a view showing a structural example of a system of an embodiment.

FIG. 1 is a view showing an example of the whole structure of the embodiment. A clothes proposing system 100 of the embodiment includes a portable terminal 200 and a server 300. The portable terminal 200 and the server 300 are connected through a network 400. The network 400 includes a wide-area network. Although FIG. 1 shows only one portable terminal 200, plural portable terminals may be provided. Besides, the server 300 may have a redundant structure.

Figure 2:
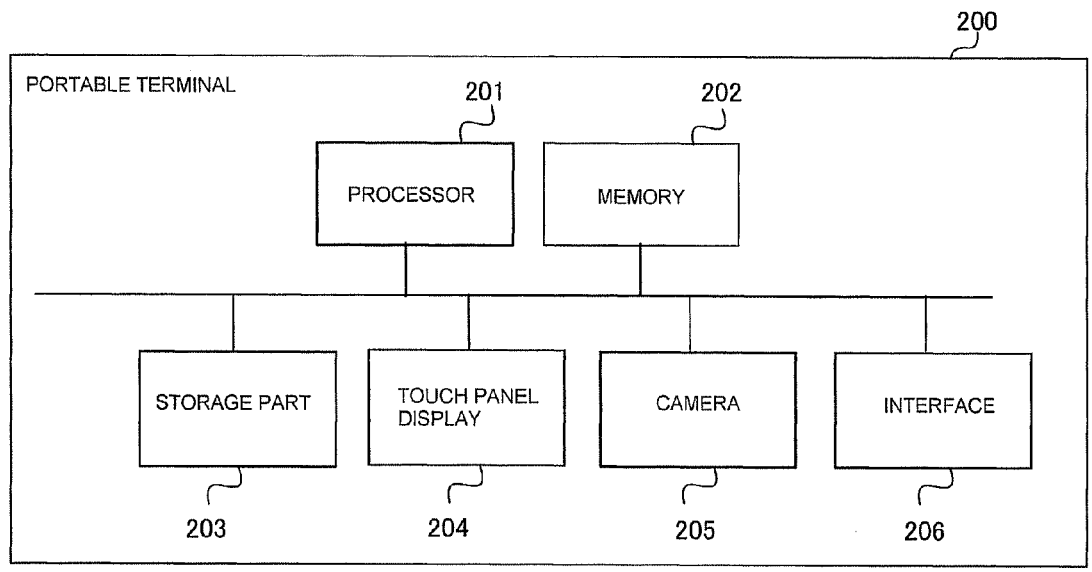
FIG. 2 is a block diagram showing a structural example of a portable terminal.

FIG. 2 is a block diagram showing a structural example of the inside of the portable terminal 200. In this embodiment, the portable terminal 200 is a smartphone having a camera function or a tablet PC (Personal Computer). The portable terminal 200 includes a processor 201, a memory 202, a storage part 203, a touch panel display 204, a camera 205 and an interface 206. The processor 201 is an arithmetic unit such as a CPU (Central Processing Unit), and controls the respective hardware in the portable terminal 200. The memory 202 includes, for example, a RAM (Random Access Memory) to volatilely store data, and a ROM (Read Only Memory) to non-volatilely store data. The storage part 203 is an auxiliary storage device such as a flash memory. The touch panel display 204 includes a display part of a liquid crystal panel and an input part of a touch sensor laminated on the surface of the display part.

The camera 205 includes an optical system such as a lens, and an image pickup device such as a CCD (Charge Coupled Device) image sensor. The camera 205 photoelectrically converts a light image obtained through the lens into electric data. The image (electric data) after the conversion is stored in, for example, the storage part 203. The interface 206 includes a communication device in conformity with short range wireless communication standards or a communication device communicable with a wide-area network or wireless LAN. In this embodiment, the interface 206 communicates with the server 300 through the wide-area network.

Figure 3:
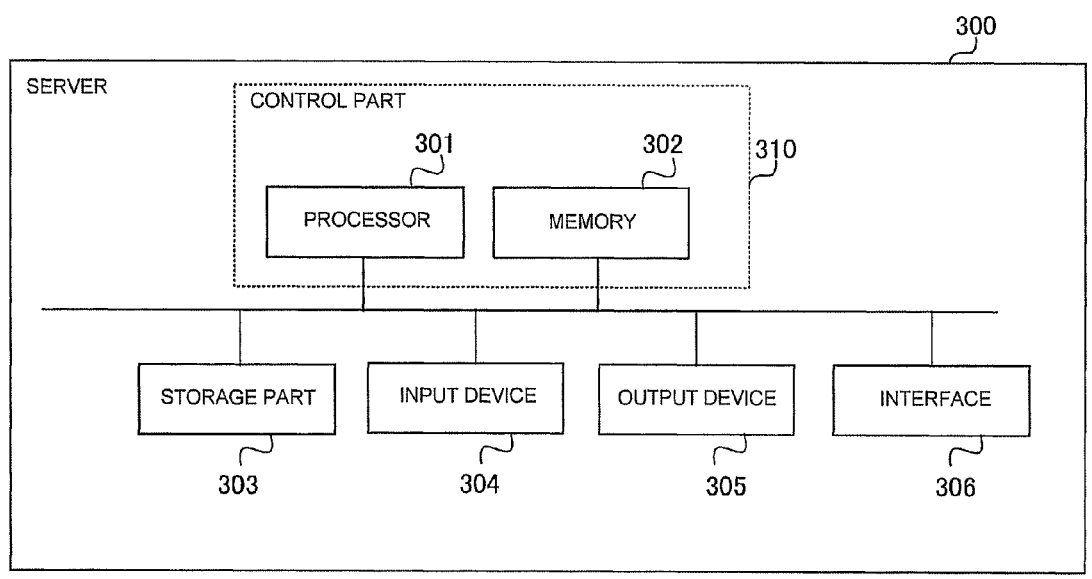
FIG. 3 is a block diagram showing a structural example of a server.

FIG. 3 is a block diagram showing a structural example of the inside of the server 300 as an information processing apparatus. The server 300 includes a processor 301 as an arithmetic unit such as a CPU, and a memory 302 including a volatile storage device and a nonvolatile storage device. Besides, the server 300 includes a storage part 303 as an auxiliary storage device such as a HDD. Besides, the server 300 includes an input device 304 such as a keyboard or a mouse, an output device 305 such as a monitor, and an interface 306 such as a network card. Incidentally, a control part 310 as a controller includes the processor 301 and the memory 302. The control part 310 may further include the storage part 303. The storage part 303 previously stores a table in which with respect to commercially available clothes, one record contains identification information of the clothes, data as features of the clothes and dimensions. This table will be described later. Besides, the storage part 303 stores also image data of commercially available clothes for each size. The image data are display data to be proposed to the user by the clothes proposing system 100.

Figure 4:
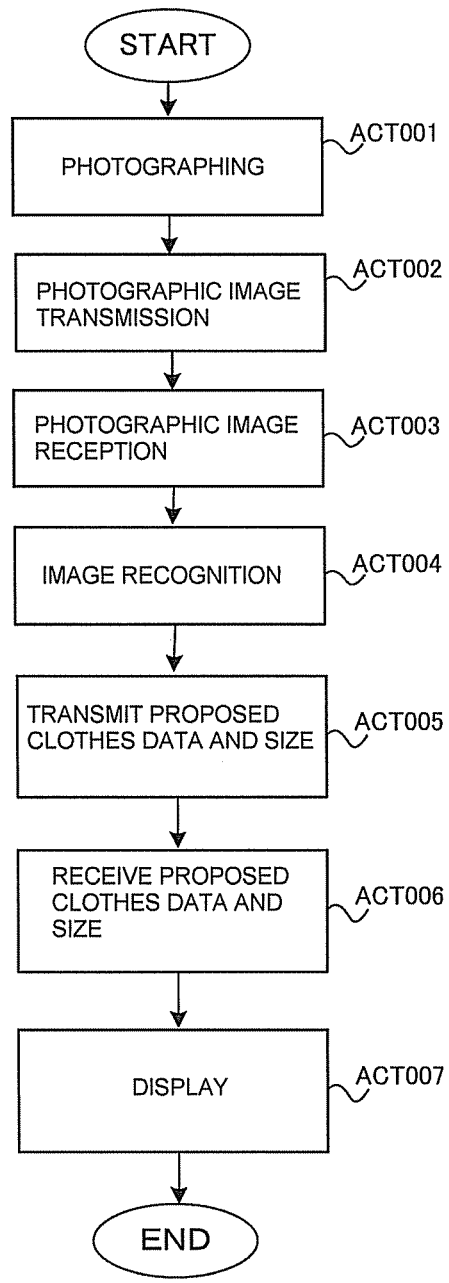
FIG. 4 is a flowchart showing the whole operation of the embodiment.

FIG. 4 is a flowchart showing an example of the whole operation of the clothes proposing system 100. The operation of the whole system will be described with reference to FIG. 4.

Figure 5:
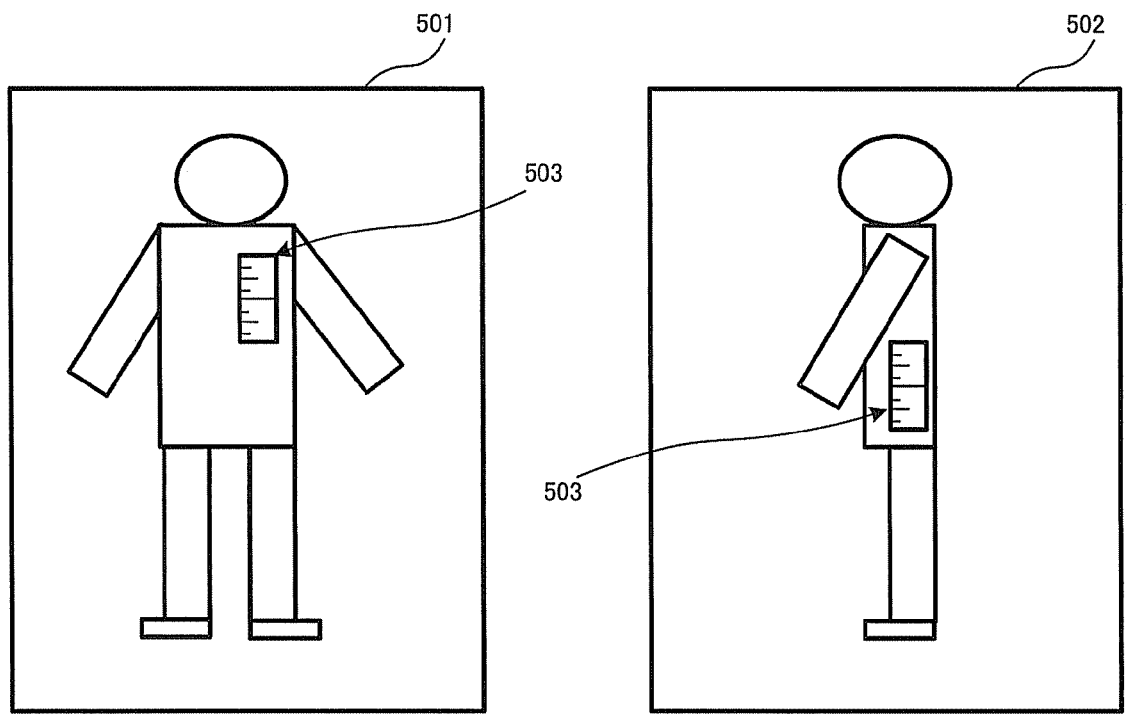
FIG. 5 is a schematic view showing an example of an image photographed by the portable terminal.

The processor 201 of the portable terminal 200 operates the camera 205 to photograph a person wearing clothes (ACT001). In the embodiment, the photographic image obtained here is used to determine the size of the clothes of the person. However, the height of the photographed person, and the dimensions such as clothes length and sleeve length are not known by merely photographing. Thus, the camera 205 simultaneously photographs a measure with a scale. FIG. 5 shows an example. In this example, a measure part 503 is stuck on the clothes and is photographed. The measure part 503 is an object as a reference of magnitude of one pixel of a photographic image. In the example of FIG. 5, two images of a front image 501 and a lateral image 502 are obtained by photographing by the camera 205. As stated above, in order to accurately determine the size, plural images are desirably photographed while the direction of the person as the subject is changed. Incidentally, other than the measure part with the scale, an object having standardized size may be simultaneously photographed. In this case, the person as the subject and the object having the standardized size are desirably located at almost the same position.

The processor 201 of the portable terminal 200 transmits the photographed image and a request telegraphic message to the server 300 through the interface 206 (ACT002). The interface 306 of the server 300 receives the photographic image and the request telegraphic message (ACT003).

The processor 301 of the server 300 performs an image recognition processing on the photographic image, and derives the size of the subject and proposed clothes (ACT004). The details of this processing will be described later. The processor 301 transmits the information relating to the size of the subject and the proposed clothes to the portable terminal 200 through the interface 306 (ACT005). The information relating to the proposed clothes includes, for example, image data of the proposed clothes, maker name, brand name, feature data such as color, and the like.

The processor 201 of the portable terminal 200 receives the information relating to the size of the subject and the proposed clothes through the interface 206 (ACT006), and displays these data on the touch panel display 204 (ACT007).

Figure 6:
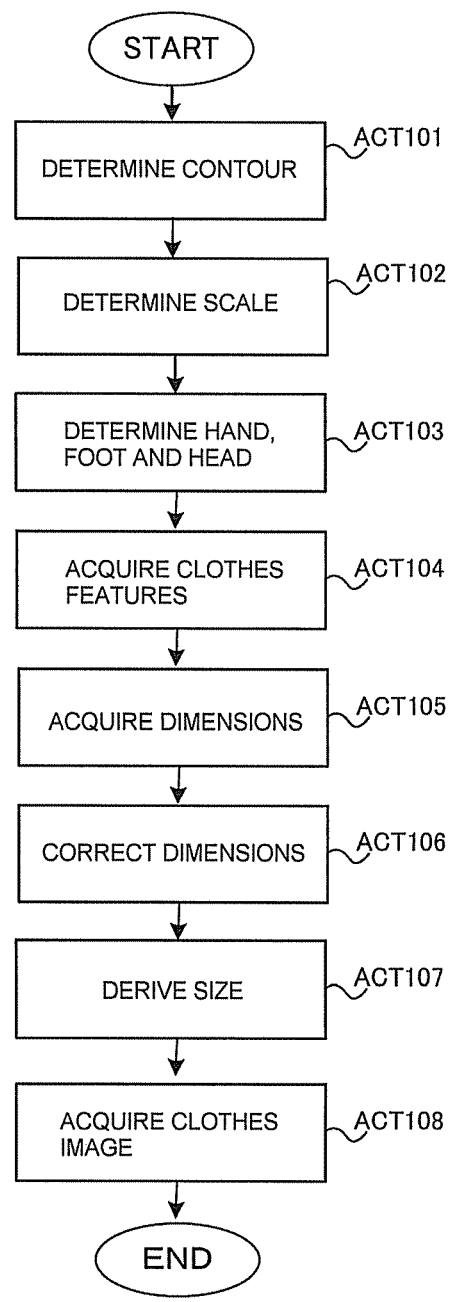
FIG. 6 is a flowchart showing an example of an image recognition operation.

Next, an example of the image recognition processing of ACT004 will be described with reference to a flowchart of FIG. 6. In this example, the processor 301 of the server 300 calculates the dimensions of the respective parts of the subject based on the photographic image and the magnitude of the measure part 503 in the photographic image. Besides, the processor 301 determines features of the clothes worn by the subject from the photographic image, specifies the worn clothes based on the features, and obtains the existing dimensions of the clothes. The processor 301 uses the existing dimensions to correct the actually measured dimensions of the subject obtained from the photographic image.

The processor 301 extracts the contour of the subject from the photographic image (ACT101). The processor 301 extracts the contour by using a previous image processing such as an edge detection processing.

The processor 301 specifies the position of the measure part 503 from the contour image extracted at ACT101 (hereinafter simply referred to as the contour image), and obtains the actual magnitude of one pixel from the relation between the scale of the measure part 503 and the number of pixels (ACT102). The storage part 303 previously stores the image data of the measure part as the reference. The processor 301 extracts a part having high similarity to the feature (pattern) of the reference image from the contour image, and sets this position to be the position of the measure part.

The processor 301 obtains position information of hand, foot and face from the contour information and the color information of the original photographic image (ACT103). The processor 301 specifies parts whose color information indicates a human skin color system from the photographic image, and specifies positions corresponding to the specified positions from the contour image. The processor 301 determines the hand, foot and head from the relative relation of the obtained positions.

The processor 301 determines the feature of the closes worn by the subject, specifies the clothes based on the feature and obtains the existing dimensions of the clothes (ACT104) ACT104 will be described with reference to FIG. 7. First, the processor 301 specifies the position of the clothes worn by the subject from the contour of the subject and the position information of the hand, foot and head. The processor 301 uses an existing image recognition processing to acquire a first feature 701 showing the feature of the worn clothes. The first feature 701 of this example is data of a combination of the color of the clothes as the base, pattern thereof, and character information drawn on the clothes. On the other hand, the storage part 303 previously stores a table 702 for managing information of clothes which are already sold. In this table, the clothes number as identification information is correlated with the respective features (second feature) of base color, pattern and character information of the clothes. Besides, the clothes number is correlated with dimension information of the length of the clothes, sleeve length, and length around neck. The processor 301 extracts from the table 702 a record containing the second feature coincident with or most approximate to the first feature obtained from the photographic image. According to the photographing conditions of the photographic image, there is a case where the base color and the pattern are not well recognized. Thus, in this example, when the second feature is not coincident with the first feature 701, the processor 301 first gives importance to the character information, and extracts the record containing the second feature in which the character information is coincident. If plural records in which the character information is coincident are extracted, the processor 301 extracts from them a record in which the base color and the pattern are approximate, and selects the one record. In the case of the example of FIG. 7, the record of the clothes number 4 is extracted.

The processor 301 obtains the dimensions of the respective parts of the subject (ACT105). The processor 301 calculates the dimensions of the respective parts, that is, the clothes length of the subject, the sleeve length and the length around neck from the actual magnitude of one pixel obtain at ACT102 and the position information of the hand, foot and face obtained at ACT103.

Figure 8:
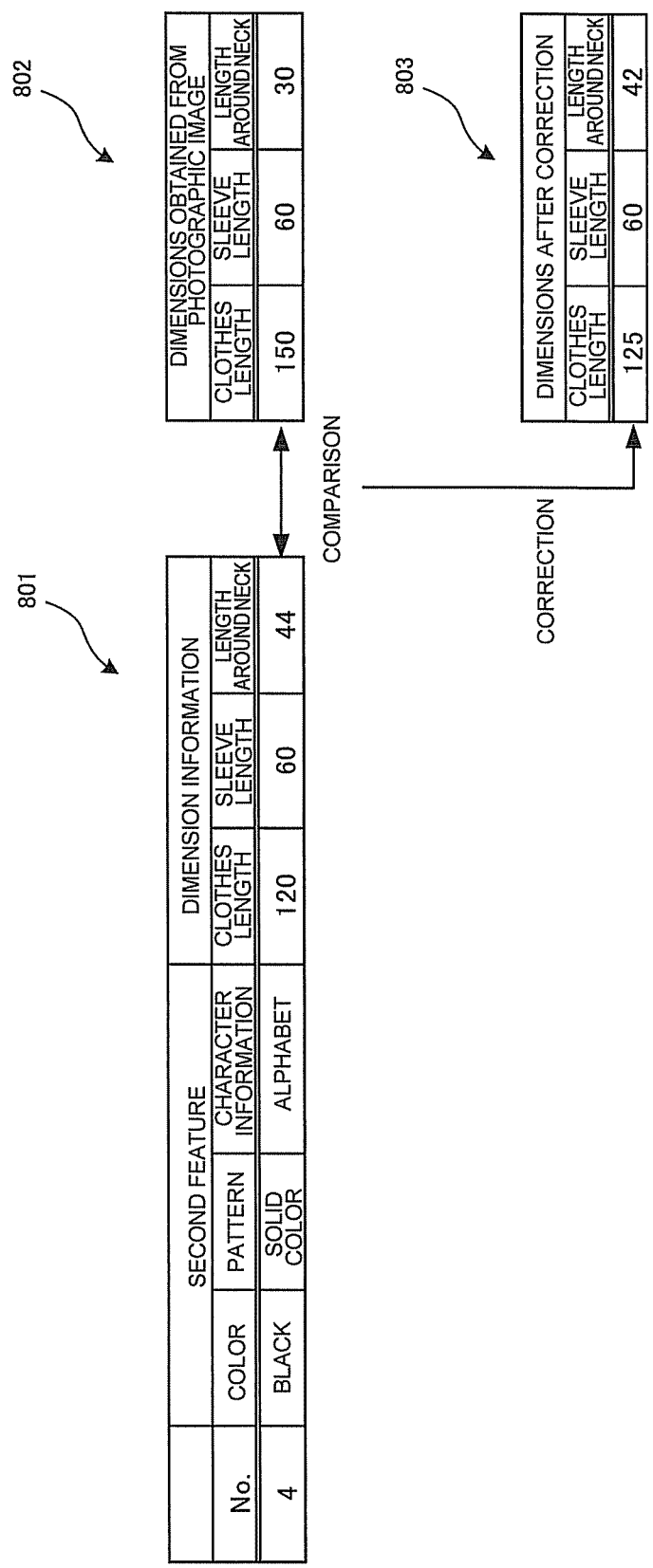
FIG. 8 is a view for explaining a size correction example.

The processor 301 further corrects the dimensions based on the record obtained at ACT104 (ACT106). ACT106 will be described with reference to FIG. 8. The processor 301 compares the dimension information (clothes length, sleeve length, length around neck) in the record obtained at ACT104 with the clothes length, sleeve length, and length around neck obtained from the photographic image. Here, if the dimensions obtained from the photographic image are larger than the dimension information in the record by a specific threshold or more or are smaller than that by a specific threshold or more, the processor 301 determines that the analysis of the photographic image is erroneous, and corrects the respective dimensions by using coefficients and a specified numerical expression in which importance is given to the dimension information in the record. In the example of FIG. 8, the dimension information of a record 801 is such that the clothes length is 120 cm, the sleeve length is 60 cm, and the length around neck is 44 cm. On the other hand, dimensions 802 obtained from the photographic image are such that the clothes length is 150 cm, the sleeve length is 60 cm, and the length around neck is 30 cm. The clothes length obtained from the photographic image is larger than the clothes length of the record 801 by 30 cm, and the length around neck is smaller than that by 14 cm. Here, if an allowable range of each dimension is ±10 cm, since the clothes length and the length around neck exceed the allowable range, the processor 301 corrects these values while importance is given to the respective values of the record 801. That is, the processor 301 corrects the dimensions so that the dimensions have values more approximate to the dimension information of the record 801 than the values of the dimensions obtained based on the photographic image. In this example, the clothes length after the correction becomes 125 cm, and the length around neck becomes 42 cm. Incidentally, since the clothes length is the same value, the processor 301 does not correct the sleeve length.

The processor 301 derives the size of the clothes based on the dimensions after the correction is performed (if the correction is not performed, the dimensions obtained at ACT105) (ACT107). The size is determined according to the maker of the clothes and the kind of the clothes. There is a case where the size notation is different among makers. For example, a clothes is denoted as L size by one maker, while the clothes is denoted as M size by the other maker. The storage part 303 of this example previously stores a table in which maker, kind of clothes, size, and dimensions of respective parts are correlated with one another. The processor 301 uses the dimensions obtained at ACT106 and this table, and converts the dimensions into the size. The size of the clothes may be information expressed in length unit, for example, in centimeter unit or inch unit, or may be something indicating the size of the clothes, such as S size, M size, L size, size 34, size 36 or size 38.

The processor 301 acquires one or plural image data (clothes images) coincident with the relevant size from the storage part 303 (ACT108). The processor 301 transmits the clothes images and the dimension information obtained at ACT107 to the portable terminal 200 (ACT005 of FIG. 4). The clothes images are previously stored in the storage part 303 for each size. The processor 301 may transmit additional information, such as maker information of the relevant clothes, kind of the clothes and color of the clothes, to the portable terminal 200.

Figure 9:
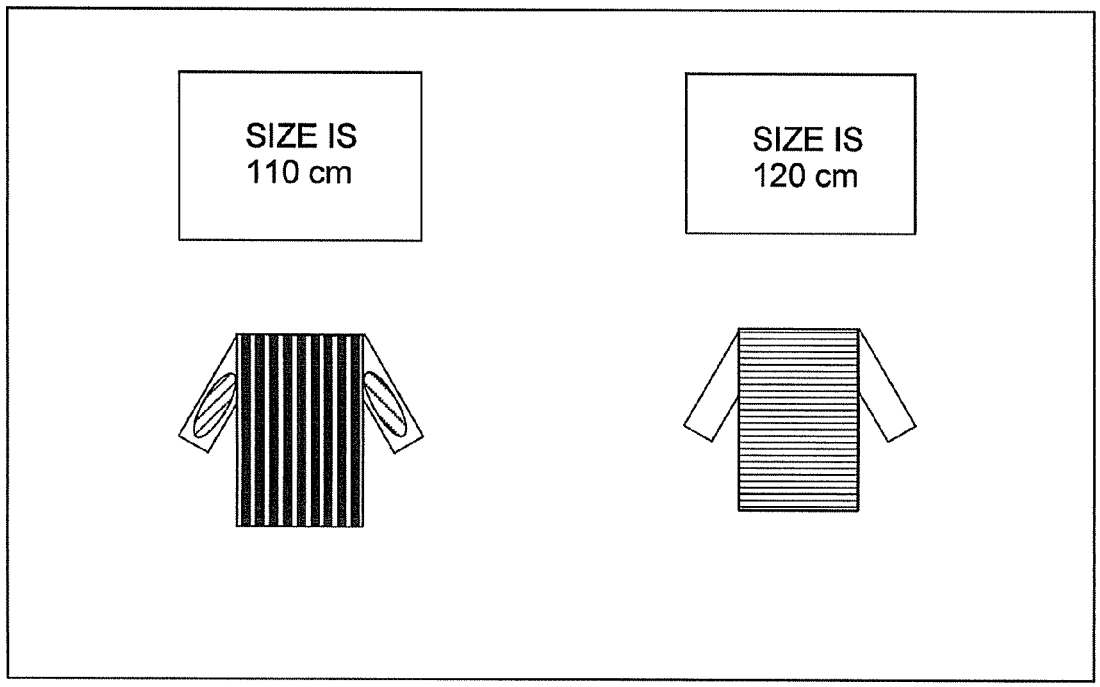
FIG. 9 is a view showing a display example of proposed clothes on a portable terminal.

FIG. 9 shows an example displayed on the portable terminal 200. The touch panel display 204 of the portable terminal 200 displays the size of the clothes and the clothes image. Besides, when the additional information exists, the touch panel display 204 displays also the kind of the clothes and the maker information.

In this embodiment, although the description is made on the case where the function to carry out the embodiment is previously stored in the apparatus, no limitation is made to this. The same function may be downloaded from the network into the apparatus, or a storage medium storing the same function may be installed in the apparatus. Any form of storage medium, such as a CD-ROM, may be used as long as a program can be stored and can be read by the apparatus. The function previously installed or obtained by download may realize the function in cooperation with an OS (Operating System) of the apparatus.

According to the embodiment, the user can obtain clothes with size suitable for the body type without going to a store.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An information processing apparatus comprising:
   an interface to receive an image which is transmitted from a first terminal and in which a person and an object as a reference of magnitude of one pixel are photographed; and
   a processor; and
   a memory that stores executable instructions that, when executed by the processor, facilitate performance of operations, comprising:
   obtaining the magnitude of one pixel from a relation between the object and a number of pixels, calculating a size of clothes suitable for the person based on the image and the magnitude of one pixel, and transmitting information relating to the clothes with the size to the first terminal through the interface.

2. The apparatus according to claim 1, wherein the operations further comprise calculating a dimension of a part of the person based on the image and the magnitude of the object in the image, and calculating the size of the clothes suitable for the person based on the dimension.

3. The apparatus according to claim 1, wherein the operations further comprise extracting first feature information indicating a feature of clothes worn by the person in the image.

4. The apparatus according to claim 3, further comprising a storage device to previously store second feature information indicating features of clothes and dimension information of the clothes for the respective clothes which are already sold, wherein the operations further comprise:
   calculating a dimension of a part of the person based on the image and the magnitude of the object in the image, and
   extracting the second feature information coincident with or most approximate to the first feature information from the storage device, and corrects the calculated dimension by using dimension information corresponding to the second feature information.

5. The apparatus according to claim 4, wherein if the dimension obtained based on the image is larger than the dimension information by a specific value or more or is smaller than the dimension information by a specific value or more, the operations further comprise correcting the dimension to cause the dimension to have a value more approximate to the dimension information than a value of the dimension obtained based on the image.

6. A clothes proposing method performed by an information processing apparatus, comprising:
   receiving an image which is transmitted from a first terminal and in which a person and an object as a reference of magnitude of one pixel are photographed;
   obtaining the magnitude of one pixel from a relation between the object and a number of pixels;
   calculating a size of clothes suitable for the person based on the image and the magnitude of one pixel; and
   transmitting information relating to the clothes with the size to the first terminal through the interface.

7. The method according to claim 6, wherein a dimension of a part of the person is calculated based on the image and the magnitude of the object in the image, and the size of the clothes suitable for the person is calculated based on the dimension.

8. The method according to claim 6, further comprising extracting first feature information indicating a feature of clothes worn by the person in the image.

9. The method according to claim 8, wherein the information processing apparatus includes a storage part to previously store second feature information indicating features of clothes and dimension information of the clothes for the respective clothes which are already sold, and the method comprises calculating a dimension of a part of the person based on the image and the magnitude of the object in the image, and extracting the second feature information coincident with or most approximate to the first feature information from the storage part, and correcting the calculated dimension by using dimension information corresponding to the second feature information.

10. The method according to claim 9, wherein if the dimension obtained based on the image is larger than the dimension information by a specific value or more or is smaller than the dimension information by a specific value or more, the dimension is corrected to cause the dimension to have a value more approximate to the dimension information than a value of the dimension obtained based on the image.

\* \* \* \* \*